US008150609B2

(12) United States Patent
Yun (10) Patent No.: US 8,150,609 B2
(45) Date of Patent: Apr. 3, 2012

(54) METHOD OF SELECTING ROUTE AND TERMINAL THEREOF

(75) Inventor: Kyungso Yun, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 797 days.

(21) Appl. No.: 11/955,147

(22) Filed: Dec. 12, 2007

(65) Prior Publication Data
US 2008/0275639 A1 Nov. 6, 2008

Related U.S. Application Data (60) Provisional application No. 60/915,221, filed on May 1, 2007.

(30) Foreign Application Priority Data

Jun. 27, 2007 (KR) .................... 10-2007-0063968

(51) Int. Cl.
G06F 19/00 (2006.01)
G08G 1/00 (2006.01)

(52) U.S. Cl. ... 701/118; 701/119; 701/207; 340/995.13; 340/933; 340/907

(58) Field of Classification Search ............... 701/209, 701/200, 213, 25, 202, 201, 120, 118, 119, 701/117, 123, 207; 340/995, 988, 990, 995.13, 340/933, 907, 910; 342/454
See application file for complete search history.

(56) References Cited

U.S. PATENT DOCUMENTS

| | | | | |
|---|---|---|---|---|
| 3,582,620 A * | 6/1971 | Noetinger | ..................... | 701/119 |
| 3,626,413 A * | 12/1971 | Zachmann | ..................... | 342/104 |
| 4,866,438 A * | 9/1989 | Knisch | ..................... | 340/936 |
| 4,985,705 A * | 1/1991 | Stammler | ..................... | 342/69 |
| 5,289,183 A * | 2/1994 | Hassett et al. | ................. | 340/905 |
| 5,337,082 A * | 8/1994 | Fredericks | ..................... | 342/69 |
| 5,465,289 A * | 11/1995 | Kennedy, Jr. | ................. | 455/424 |
| 7,197,500 B1 * | 3/2007 | Israni et al. | ................... | 707/809 |
| 7,375,649 B2 | 5/2008 | Gueziec | | |
| 7,617,043 B2 | 11/2009 | Zhao et al. | | |
| 7,831,380 B2 * | 11/2010 | Chapman et al. | ............. | 701/118 |

(Continued)

FOREIGN PATENT DOCUMENTS

KR 10-1999-0068262 B1 10/2001

(Continued)

*Primary Examiner* — Ronnie Mancho
(74) *Attorney, Agent, or Firm* — Birch, Stewart, Kolasch & Birch, LLP (57) ABSTRACT

A method of selecting a travel route including receiving message information formed in a hierarchical structure and including traffic information, receiving a first position value and a second position value corresponding to first and second positions, searching for travel routes between the first and second positions, classifying the travel routes from the first position to the second position into a plurality of individual road links, calculating a route cost for a first road link that includes the first position and a second road link directly connected to the first road link based on an average link speed for the first and second road links, respectively, calculating a route cost for each additional road link after the first and second road links up to a last road link including the second position based on one of a current traffic congestion status information and a predicted traffic congestion status information, and calculating a total route cost for all of the road links for the travel routes from the first position to the second position.

20 Claims, 9 Drawing Sheets

U.S. PATENT DOCUMENTS

| | | | |
|---|---|---|---|
| 7,925,426 B2 * | 4/2011 | Koebler et al. | 701/123 |
| 2003/0135383 A1 | 7/2003 | Mizuno | |
| 2004/0073361 A1 * | 4/2004 | Tzamaloukas et al. | 701/210 |
| 2005/0090976 A1 * | 4/2005 | Beesley et al. | 701/209 |
| 2005/0131641 A1 * | 6/2005 | Beesley et al. | 701/209 |
| 2007/0010942 A1 * | 1/2007 | Bill | 701/209 |
| 2007/0019562 A1 | 1/2007 | Kim et al. | |
| 2007/0150185 A1 * | 6/2007 | Nagase et al. | 701/209 |
| 2007/0198179 A1 * | 8/2007 | Ishikawa | 701/209 |
| 2007/0208498 A1 * | 9/2007 | Barker et al. | 701/117 |
| 2007/0290839 A1 * | 12/2007 | Uyeki et al. | 340/539.13 |
| 2008/0010002 A1 | 1/2008 | DeKock et al. | |
| 2008/0071465 A1 * | 3/2008 | Chapman et al. | 701/117 |
| 2008/0275639 A1 | 11/2008 | Yun | |

FOREIGN PATENT DOCUMENTS

| | | |
|---|---|---|
| KR | 10-2003-0022161 B1 | 3/2003 |
| KR | 10-2003-0041157 A | 5/2003 |
| KR | 10-2004-0050459 B1 | 6/2004 |

* cited by examiner

| <ctt_component(81)>:= | : Prediction congestion and travel time status |
|---|---|
| <intunti>(id), | : Identifier, id=81 hex |
| <intunli>(n), | : Data length (n) of component of units of byte |
| m*<prediction_status_component()>; | : Prediction status component |

| <prediction_status_component(00)>:= | : Prediction average link speed |
|---|---|
| <intunti>(id), | : Identifier, id=00 hex |
| <intunli>(n), | : Data length (n) of component of units of byte |
| <intunti>, | : Speed(km/h) |
| <intunlo>; | : Prediction time (UTC) |

FIG. 5C

| <prediction_status_component(01)>:= | : Prediction travel time |
|---|---|
| <intunti>(id), | : Identifier, id=01 hex |
| <intunti>(n), | : Data length (n) of component of units of byte |
| <intunli>, | : Time (second) |
| <intunlo>; | : Prediction time (UTC) |

FIG. 5D

| <prediction_status_component(02)>:= | : Congestion tendency |
|---|---|
| <intunti>(id), | : Identifier, id=02 hex |
| <intunti>(n), | : Data length (n) of component of units of byte |
| <ctt04>; | : Congestion tendency |

FIG. 5E

| <ctt_component(8A)>:= | : Additional information |
|---|---|
| <intunti>(id), | : Identifier, id=8A hex |
| <intunli>(n), | : Data length (n) of component of units of byte |
| <ctt41>, | : Language code |
| <short_string>; | : Additional information |

METHOD OF SELECTING ROUTE AND TERMINAL THEREOF

The present application claims priority under 35 U.S.C. §119 to Korean Patent Application No. 10-2007-0063968 filed in the Republic of Korea on Jun. 27, 2007, the entire contents of which are hereby incorporated by reference. The present application also claims priority under 35 U.S.C. §119 to U.S. Provisional Application No. 60/915,221, filed on May 1, 2007, the entire contents of which are hereby incorporated by reference.

BACKGROUND OF THE INVENTION

1. Field of the Invention

The present invention relates to a method and corresponding terminal for selecting an optimal travel route.

2. Discussion of the Background

Today, traffic congestion is a serious problem. Many people often spend more than an hour each day commuting back and forth to work. This is because the number of vehicles is increasing faster than the expansion of roads and traffic facilities.

Therefore, many automobile manufacturers now provide navigation systems with each automobile. In more detail, the navigation system includes a global positioning system (GPS) receiver that receives navigation messages transmitted from GPS satellites. The navigation system also includes a gyroscope, a speed sensor and a control unit that used to determine the driving status of the vehicle.

For example, the current location of the vehicle can be detected using a Dead-Reckoning process on received navigation messages. The detected current location of the vehicle is then displayed together with a map on a display unit. Therefore, the driver of the vehicle can use the navigation system determine their current position and the shortest route to a desired destination.

Further, many broadcasting networks now provide traffic information. That is, a broadcasting station broadcasts traffic information using a Transport Protocol Expert Group (TPEG) standard and a Digital Multimedia Broadcast (DMB) transmission standard.

However, the related art navigation system using the TPEG standard selects a travel route using a preset travel time, and does not provide a real time analysis of the traffic conditions while the vehicle is traveling. Thus, the map provided by the navigation system does not include the best route to take based on the current road conditions (e.g., congestion, weather, etc).

SUMMARY OF THE INVENTION

Accordingly, one object of the present invention is to address the above-noted and other problems.

Another object of the present invention is to provide a method and corresponding terminal that searches for an optimal route using at least one of current traffic congestion status information and prediction traffic congestion status information and for guiding a vehicle along the optimal route.

To achieve these and other advantages and in accordance with the purpose of the present invention, as embodied and broadly described herein, the present invention provides in one aspect a method of selecting a travel route including receiving message information formed in a hierarchical structure and including traffic information, receiving a first position value and a second position value corresponding to first and second positions, searching for travel routes between the first and second positions, classifying the travel routes from the first position to the second position into a plurality of individual road links, calculating a route cost for a first road link that includes the first position and a second road link directly connected to the first road link based on an average link speed for the first and second road links, respectively, calculating a route cost for each additional road link after the first and second road links up to a last road link including the second position based on one of a current traffic congestion status information and a predicted traffic congestion status information, and calculating a total route cost for all of the road links for the travel routes from the first position to the second position.

In another aspect, the present invention provides a navigation terminal including a receiving unit configured to receive message information formed in a hierarchical structure and including traffic information, an input unit configured to receive a first position value and a second position value corresponding to first and second positions, and a control unit configured to search for travel routes between the first and second positions, to classify the travel routes from the first position to the second position into a plurality of individual road links, to calculate a route cost for a first road link that includes the first position and a second road link directly connected to the first road link based on an average link speed for the first and second road links, respectively, to calculate a route cost for each additional road link after the first and second road links up to a last road link including the second position based on one of a current traffic congestion status information and a predicted traffic congestion status information, and to calculate a total route cost for all of the road links for the travel routes from the first position to the second position.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
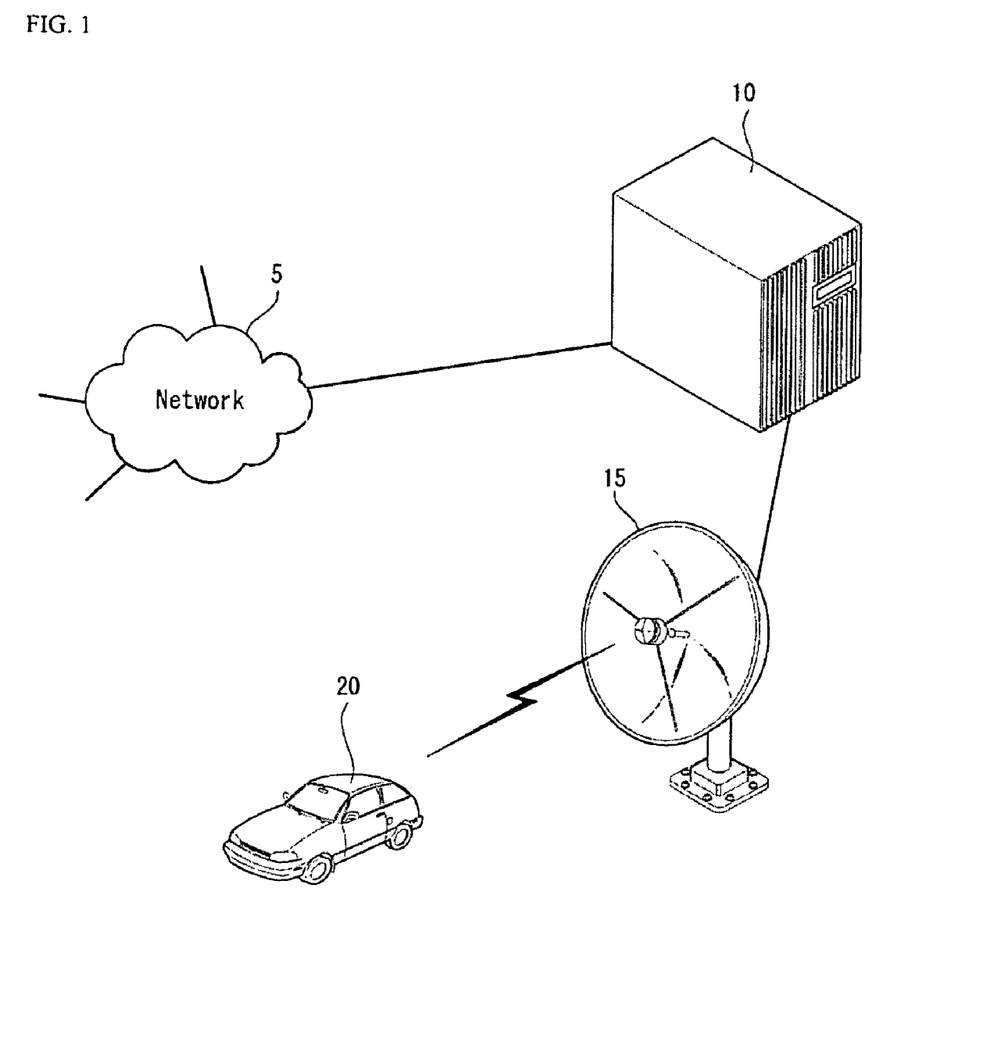
FIG. 1 is an overview illustrating a traffic information providing system according to an embodiment of the present invention.

First, FIG. 1 is an overview illustrating a traffic information providing system according to an embodiment of the present invention. As shown in FIG. 1, the traffic information providing system includes a network 5, a traffic information providing server 10, a broadcasting station 15 and a vehicle 20.

The network 5 includes wired and wireless communication networks such as a Local Area Network (LAN) and a Wide Area Network (WAN). Further, various traffic information is collected through the network 5, and the collected information is processed in a format to be described later in the traffic information providing server 10 and is transmitted to the broadcasting station 15. The broadcasting station 15 inserts the processed traffic information into a broadcasting signal and broadcasts the broadcasting signal to the vehicle 20.

In addition, the traffic information providing server 10 reconstitutes traffic information collected from a variety of sources such as an operator's input, wired and wireless Internet, a digital broadcasting service such as a Transparent Data Channel (TDC) and a Multimedia Object Transport (MOC), another server or a probe car in a traffic information format such as the format according to the TPEG standard (the standard for traffic information service). The server 10 also sends the reconstituted traffic information to the broadcasting station 15, and the broadcasting station 15 broadcasts the traffic information using a broadcasting signal. A navigation device mounted in the vehicle 20 may then receive the broadcasted information.

Further, the broadcasted traffic information includes information about various traffic conditions corresponding to a road (for automobiles), the ocean (for watercraft), and an airline service (for airplanes). For example, the traffic information may include information about an accident, a road status, traffic congestion, road construction, road closure, delay of a public traffic network, delay of an airline service, police activity in a particular area, etc.

The broadcasting station 15 receives the processed traffic information from the server 10 and transmits the received traffic information to the vehicle 20 through a digital signal according to various digital broadcasting standards. For example, the broadcasting standard may be a terrestrial or satellite DMB standard, terrestrial digital video broadcasting (DVB-T) standard, mobile digital video broadcasting-handheld (DVB-H) standard, Media Forward Link Only (MFLO) standard, and European digital audio broadcasting (DAB) standard based on Yureka-147 (ETSI EN 300 401). Further, the broadcasting station 15 transmits the traffic information through wired and wireless networks such as the wired and wireless Internet.

In addition, the vehicle 20 shown in FIG. 1 is an automobile. However, the vehicle 20 may be any other type of transportation vehicle such as a bus, a train, a ship, an airplane, etc. The following description assumes the vehicle 20 is an automobile.

Thus, the traffic information reception terminal mounted in the vehicle receives TPEG data from the broadcasting station 15, processes the received data, and outputs the processed data to a user using a display and/or audio.

Figure 2:
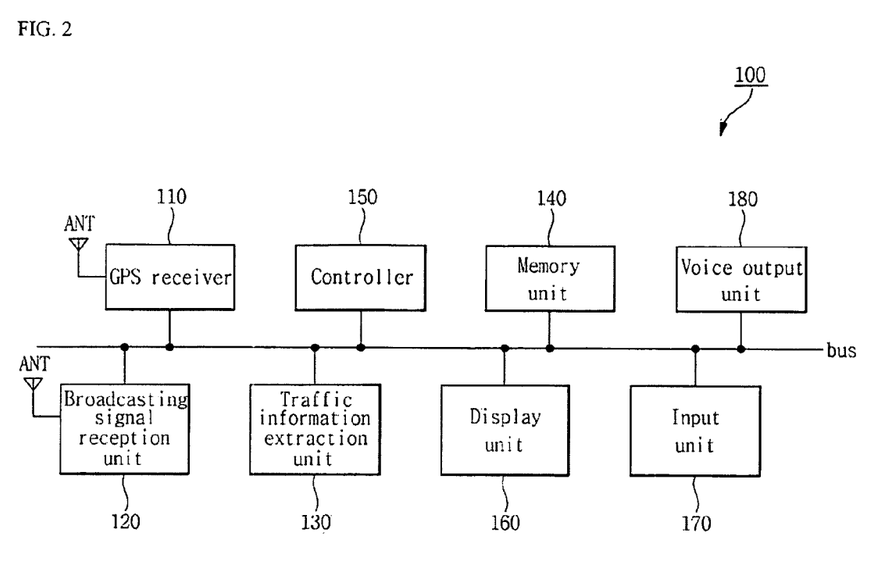
FIG. 2 is a block diagram illustrating a navigation terminal according to an embodiment of the present invention.

Next, FIG. 2 is a block diagram illustrating a traffic information reception terminal 100 according to an embodiment of the present invention. The traffic information reception terminal 100 may be classified as an in-dash type and an on-dash type. That is, the in-dash type traffic information reception terminal 100 is inserted into a predetermined space in the dash board of the vehicle 20 and is fixedly mounted. Further, the on-dash type traffic information reception terminal is provided on the dash board of the vehicle 20 (the terminal may be detachably attached to the dash board using a support member). Therefore, the on-dash type traffic information reception terminal can be detached from the vehicle 20 and carried. Thus, the on-dash type terminal is often referred to as a portable navigation device. The traffic information reception terminal 100 can also be a mobile terminal or any other terminal that can perform a navigation function.

As shown in FIG. 2, the traffic information reception terminal 100 includes a GPS receiver 110, a broadcasting signal reception unit 120, a traffic information extraction unit 130, a memory unit 140, a controller 150, a display unit 160, an input unit 170 and a voice output unit 180.

Further, the GPS receiver 100 receives a navigation message transmitted by the GPS satellite through an antenna ANT and provides the navigation message to the controller 150. Also, the broadcasting signal reception unit 120 receives a broadcasting signal including traffic information provided from the traffic information providing server 10 through the antenna ANT. The broadcasting signal received by the broadcasting signal reception unit 120 includes video and audio data according to various standards such as terrestrial or satellite DMB, DAB, and digital video broadcasting (DVB-T and DVB-H), traffic information according to a traffic information service and a Binary Format for Scene (BIFS) data service, and other various information.

Figure 3:
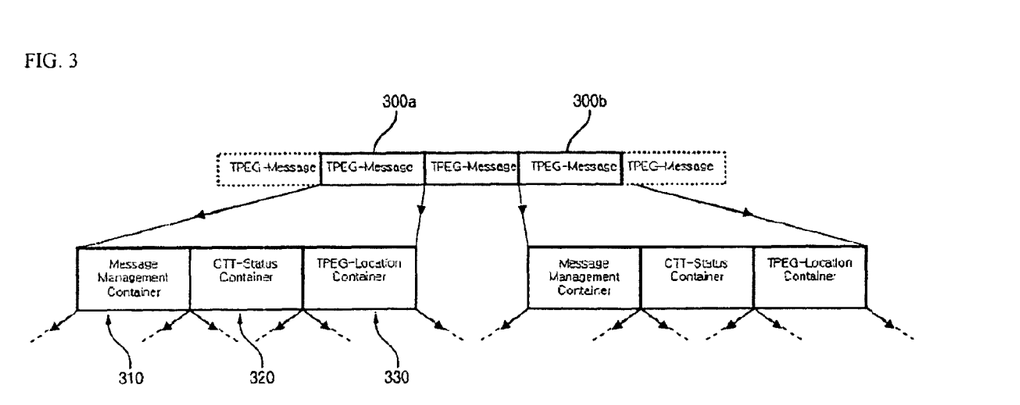
FIG. 3 is a protocol diagram illustrating a format of traffic information wirelessly transmitted according to an embodiment of the present invention.

Further, the broadcasting signal reception unit 120 synchronizes a signal band in which the traffic information is provided, demodulates the synchronized signal, and outputs the demodulated signal. The traffic information extraction unit 130 receives the demodulated signal output from the broadcasting signal reception unit 120 and decodes the message into a TPEG message sequence as shown in FIG. 3. The extraction unit 130 then analyzes each TPEG message within the sequence, and transmits traffic information and/or a control signal to the controller 150 based on the analyzed information. The controller 150 then stores the transmitted traffic information in the memory unit 140.

In addition, the memory unit 140 includes a non-volatile memory for storing a program used for performing various functions of the traffic information reception terminal 100, and a volatile memory for temporarily storing various data generated according to the operation of the traffic information reception terminal 100. The non-volatile memory also is used to store various data used for selecting an optimal route to reach a desired destination. For example, the memory unit 140 stores traffic information including a travel time and prediction travel time extracted from the traffic information extraction unit 130 in a lookup table form that is used when searching for an optimal route.

Further, the memory unit 140 stores map data the user can view to operate the vehicle 20 based on a navigation message received through the GPS receiver 110. The map data includes an intersection with another road or a road branch point such as an interchange, various geographical data such as a road link for connecting each branch point, a road link distance, geographical information, a map, etc.

In addition, when the traffic information reception terminal 100 does not store map data because of a limited memory capacity, various geographical data may be stored in the memory unit 140 in a text form. Further, a road link includes one or more road links that are used when traveling to a desired destination. A road link between branch points will also be referred to as a unit road link.

Also, a road link between a starting point and a destination may include a set of one or more unit road links. That is, a unit road link indicates a road link between branch points, and the vehicle 20 entering a unit road link cannot branch off to another road link until a next branch point appears. Further, each road link in the map data is recognized by a link identifier. The link identifier can include, for example, the latitude and longitude of a starting point and an ending point of a link, a character, a numeral, or combination of characters and numerals such as a name of the link.

In addition, the controller 150 includes a processor for processing various data input to the traffic information reception terminal 100, and controls the overall operations of the traffic information reception terminal 100. Further, the controller 150 searches for map data including various positions corresponding to the vehicle 20 such as a current position, a starting point, and a destination point for the vehicle 20 from the memory unit 140 based on a navigation message received by the GPS receiver 110, and searches for all possible routes to the destination. Also, the controller 150 selects an optimum route using traffic information extracted from the traffic information extraction unit 130, and displays the selected route on the display unit 160.

In addition, the display unit 160 displays map data read from the memory unit 140 according to a navigation message received in the GPS receiver 110, a current position of the vehicle 20, traffic information, and a route of the vehicle 20 on a map, under the control of the controller 150. The display unit 160 may be a Liquid Crystal Display (LCD) and may include a touch screen. The display unit 160 also displays various functions provided by the traffic information reception terminal 100 in a menu structure form, and is used by the user to input or select a particular function displayed on the display unit 160.

The input unit 170 then receives the various operation instructions from the user and provides the various operation instructions to the controller 150. The input unit 170 includes at least one of a key input unit having numeral or function keys, a touch pad for inputting information, and a remote control unit installed in a steering wheel within the vehicle 20 for allowing the user to easily input information into the traffic information reception terminal 100.

Further, the voice output unit 180 generates an audio signal, amplifies the audio signal to a selected predetermined level that is set using the input unit 170, and outputs the amplified audio signal through one or more speakers (not shown).

Next, FIG. 3 is a diagram illustrating a format of transmitted traffic information. As shown in FIG. 3, the format includes sequence message segments (hereinafter, a message segment is referred to as a TPEG message). Further, a TPEG message 300a among the TPEG messages is applied to at least one application. For example, the TPEG message 300a may indicate a TPEG-congestion and travel-time information application (TPEG-CTT), and another TPEG message 300b may indicate a TPEG-public transport information application or a TPEG-road traffic message application including accident and unexpected status information.

Further, a unique identification number referred to as an Application Identifier (AID) is allocated to each TPEG application. The AID is used to decode the received TPEG message using the most suitable application decoder. The AID 0010 (hex) is allocated to the TPEG-CTT.

The TPEG-CTT is provided to road users and includes information that has an influence on using a road such as traffic information in a road network, congestion and a travel time. Further, as shown in FIG. 3, the TPEG message 300a including congestion and travel-time information message has a message management container 310, an application status container 320, and a TPEG-location container 330. The other TPEG messages include similar containers.

The application status container 320 is a TPEG-CTT container. Further, the contents of the application status container 320 change according to a type of the TPEG message application. In addition, as shown, the TPEG message 300b for transmitting other traffic information is included in the TPEG message sequence, and thus at least two applications may be included within one TPEG message stream.

In addition, the message management container 310 includes a message identifier (MID) and a version number (VER). Further, the message management container 310 may include a date and time element, and a message generation time. The elements included in the message management container 310 are used for managing information received in a TPEG decoder. However, unlike the other applications (accident and unexpected status information application and popular traffic information application) of the TPEG, in the congestion traffic information application related to a data and a time among elements of the message management container 310, a start time and an end time, a message elimination time, and schedule information are not transmitted. This is because unlike the unexpected status information to manage and transmit a message according to a changing status every moment, in the congestion traffic information, it is important to transmit a current traffic status at each point.

Further, the TPEG-CTT container 320 includes current traffic congestion status information and prediction traffic congestion status information for each road link. Also, in the container 320, the status information follows a hierarchical structure and assures terminal compatibility with an expanded standard or additional component.

Next, Table 1 shows a class of the TPEG-CTT container 320.

TABLE 1

| Class | Description |
|---|---|
| Congestion and travel time status CTT_Status | In a traffic network or a random road link, describe a traffic status of the vehicle |

TABLE 1-continued

| Class | Description |
| --- | --- |
| Prediction congestion and travel time status Prediction_CTT_Status | In a traffic network or a random road link, describe a prediction traffic status of the vehicle |
| Additional Information | Describe addition information about a traffic status of the vehicle in a text form |

Referring to Table 1, the TPEG-CTT container 320 includes the CTT status component for transmitting current traffic congestion status information, the prediction CTT status component for transmitting prediction traffic congestion status information, and the additional information component including additional information or auxiliary information related to congestion and travel time information.

Figure 4A:
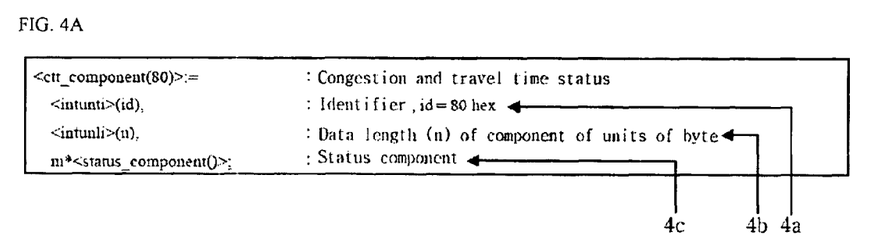
FIG. 4A illustrates a structure of a congestion and travel time status component for transmitting current traffic congestion status information according to an embodiment of the present invention.

FIG. 4A shows a structure of a CTT status component for transmitting current traffic congestion status information included in the TPEG-CTT container 322. An identifier (4*a*) (id=80hex) is allocated to the CTT status component. Further, the CTT status component includes the m-number of status components, and has a field in which a total data length of the status component is expressed with units of a byte (4*b*). Reference numeral 4*c* identifies the CTT status component as a status component.

Figure 4B:
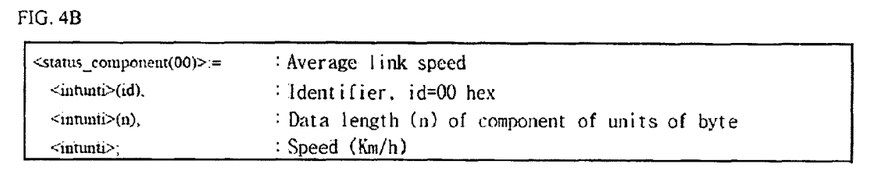
FIGS. 4B to 4E respectively illustrate current traffic congestion status information including an average link speed, a travel time, link delay, and a congestion type information format included in each status component of the congestion and travel time status component according to an embodiment of the present invention.

FIGS. 4B to 4E illustrate the status components corresponding to the current traffic congestion status information including an average link speed, a travel time, link delay and congestion type. As shown in FIG. 4B, the identifier '00' is provided in the average link speed, and (Km/h) is used as the units of the average link speed. Miles per Hour (Mph) may also be used as the average link speed.

Figure 4C:
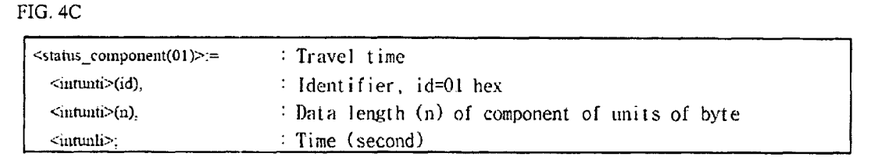
Figure 4D:
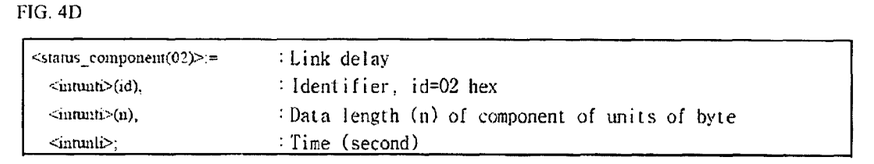
Figure 4E:
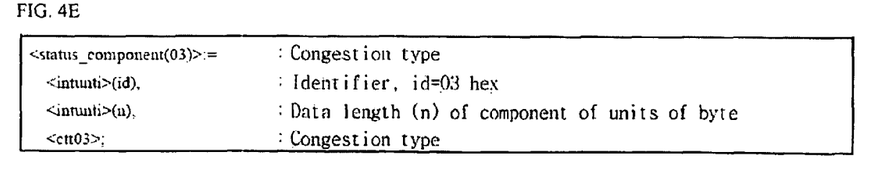

As shown in FIG. 4C, the identifier '01' is provided in the travel time, and (sec) is used as the units of travel time. In FIG. 4D, the identifier '02' is provided in the link delay, and (sec) is used with units of the link delay. In FIG. 4E, the identifier '03' is allocated to the congestion type status component.

Figure 5A:
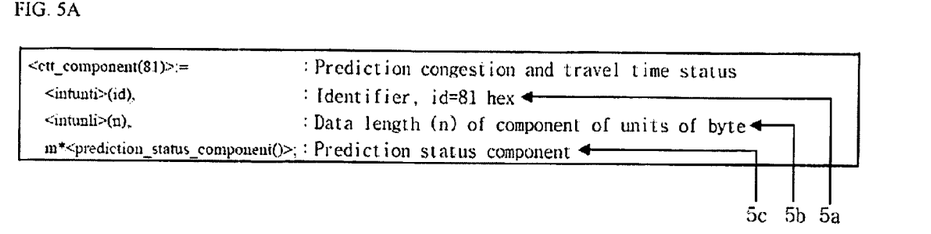
FIG. 5A illustrates a structure of a prediction congestion and travel time status component for transmitting prediction traffic congestion status information.

FIG. 5A illustrates the structure for the prediction CTT status component for transmitting prediction traffic congestion status information included in the TPEG-CTT container 320. As shown in FIG. 5A, the identifier '81h' is allocated to the prediction CTT status component for transmitting prediction information (5*a*). Further, a total data length of the status component is expressed in byte units (5*b*). The reference numeral 5*c* identifies the type of status component (i.e., a prediction status component).

Further, as shown in FIGS. 5B to 5E, each status component of the prediction CTT status component includes prediction traffic congestion status information such as a prediction average link speed, a prediction travel time, a congestion tendency and additional information.

As shown in FIGS. 5B to 5E, the identifier '00' is provided in the prediction average link speed, the identifier '01' is provided in the prediction travel time, the identifier '02' is provided in the congestion tendency, and the identifier '03' is provided in the addition information.

Figure 6:
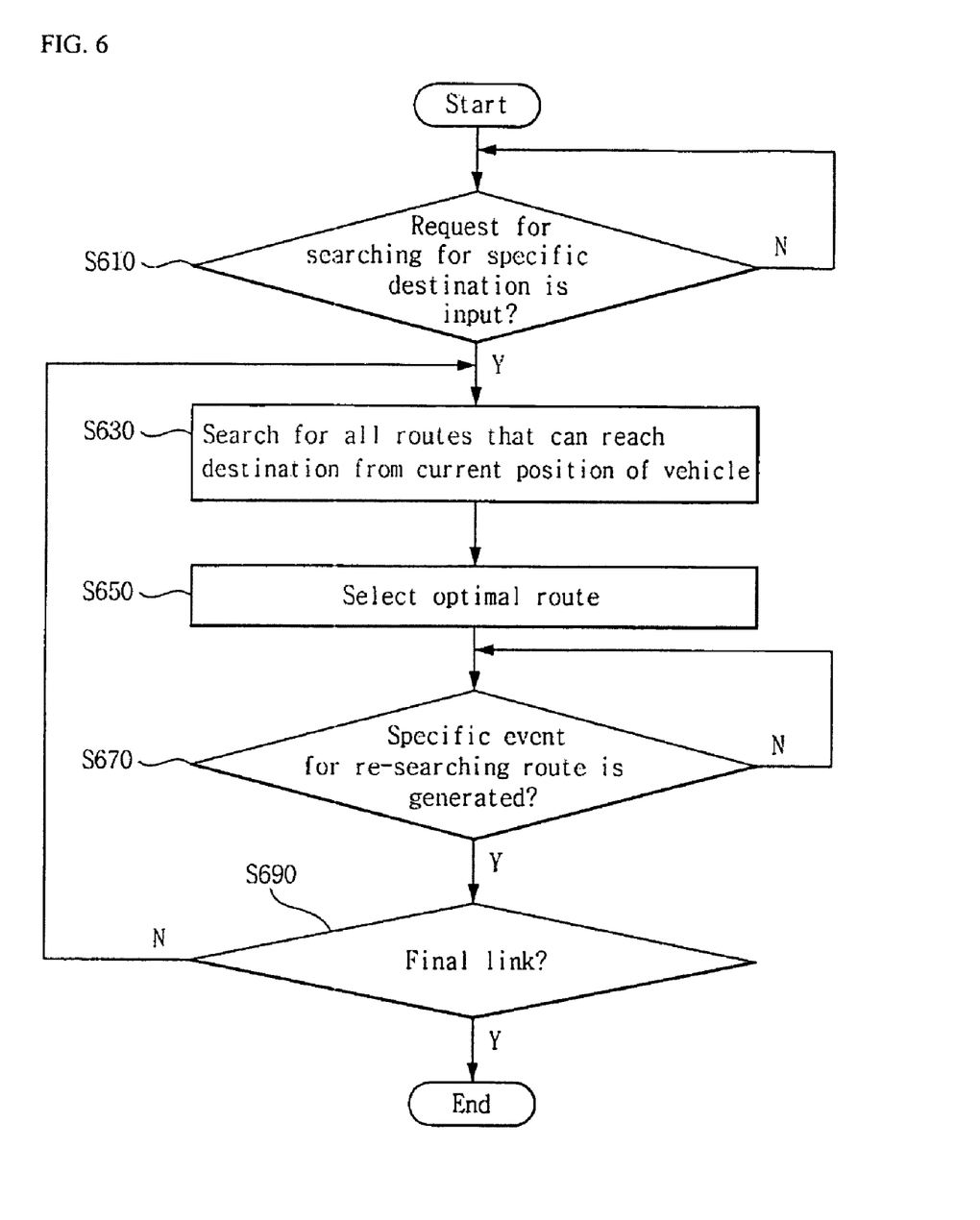
FIG. 6 is a flowchart illustrating a method of selecting a travel route according to an embodiment of the present invention.

Next, FIG. 6 is a flowchart illustrating a method of selecting an optimal travel route according to an embodiment of the present invention. FIG. 2 will also be referred to in the descriptions of the embodiments of the present invention. As shown in FIG. 6, the controller 150 determines whether the user has requested a search for a route to a predetermined destination (S610). If the controller 150 determines the user has requested this information (yes in S610), the controller 150 extracts the map data stored in the memory unit 140 and detects all routes from the current location of the vehicle 20 to the desired destination using the navigation message received in the GPS receiver 110 (S630).

The controller 150 then selects an optimal route among the detected routes based on the Congestion and Travel-Time information extracted from the TPEG CTT message by the traffic information extraction unit 130 (S650). When the travel guide is started and the vehicle 20 moves, the controller 150 determines whether a specific event for re-searching a route is generated (S670). If a specific event for re-searching a route is generated (yes in S670), the controller 150 determines whether a road link at which the vehicle 20 is currently positioned is a final link (S690). If a road link at which the vehicle 20 is currently positioned is not a final link (No in S690), the process returns to step S630. Accordingly, a navigation process is performed, which can give directions to a user to guide the user along the optimal route.

The process in which the controller 150 selects an optimal route among the detected routes will now be described in more detail with respect to FIGS. 7 and 8. That is, FIG. 7 is a flowchart illustrating a process of selecting an optimal route at step S650 in FIG. 6, and FIG. 8 is a diagram describing the flowchart in FIG. 7.

Figure 7:
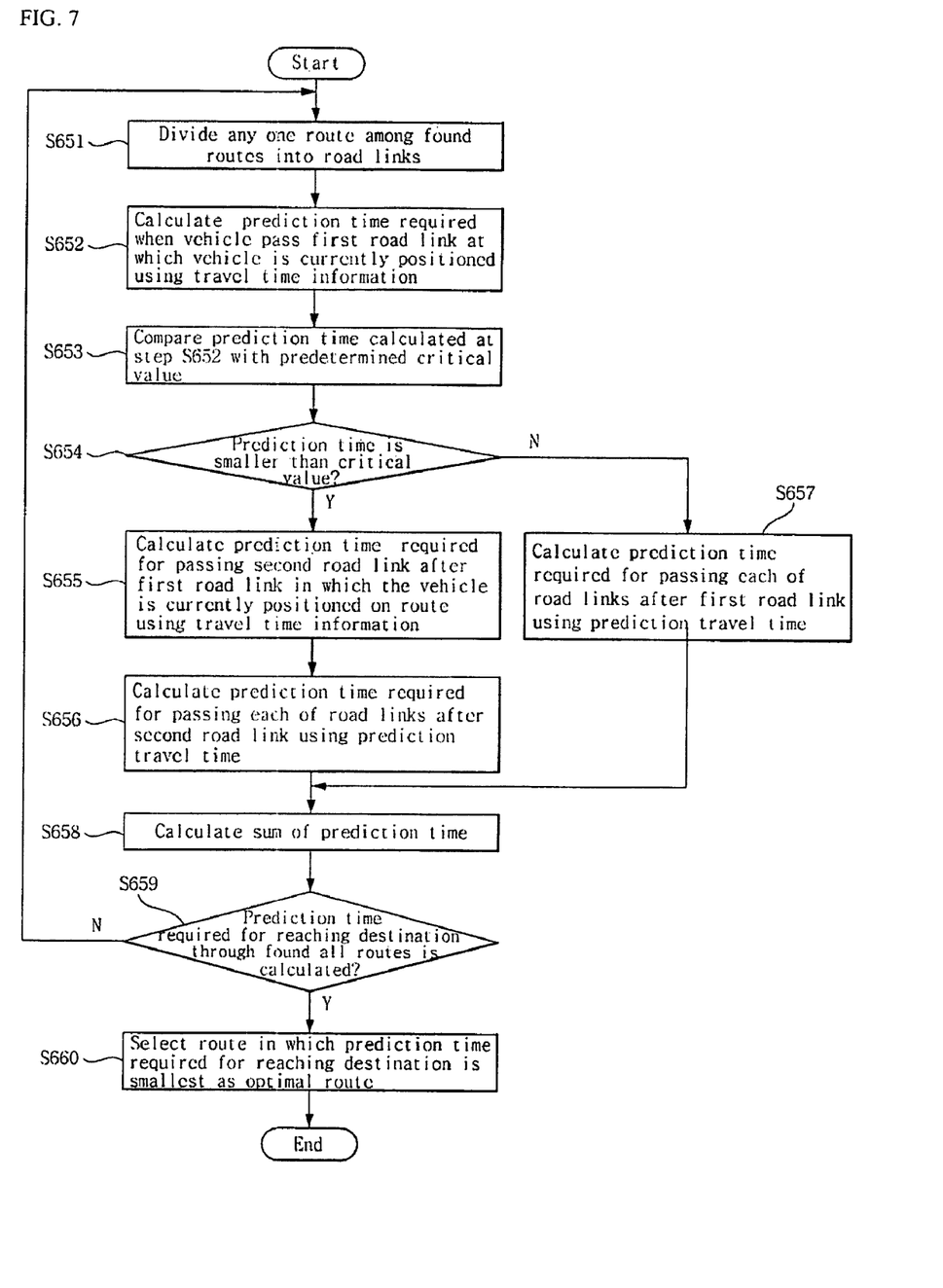
FIG. 7 is a flowchart illustrating a process of selecting an optimal route at step S650 in FIG. 6.

Referring to FIG. 7, the controller 150 classifies one of the detected routes into road links (S651). In FIG. 8, a route from the current location of the vehicle 20 to the desired destination includes a total of six road links #1 to #6. As shown in FIG. 8, the vehicle is located at the first road link #1 and the desired destination is located at the sixth road link #6. Further, the controller 150 checks the average link speed information for the first road link #1 with reference to the memory unit 140.

As shown in FIG. 7, the controller 150 calculates a route cost of the first road link #1 by dividing an average link speed of the checked first road link #1 by a distance from the current position of the vehicle 20 to an end point of the first road link #1 (S652). A unit of the average link speed is (km/h) and a unit of the distance is (km). The units of miles per hour (mph) may also be used.

Figure 8:
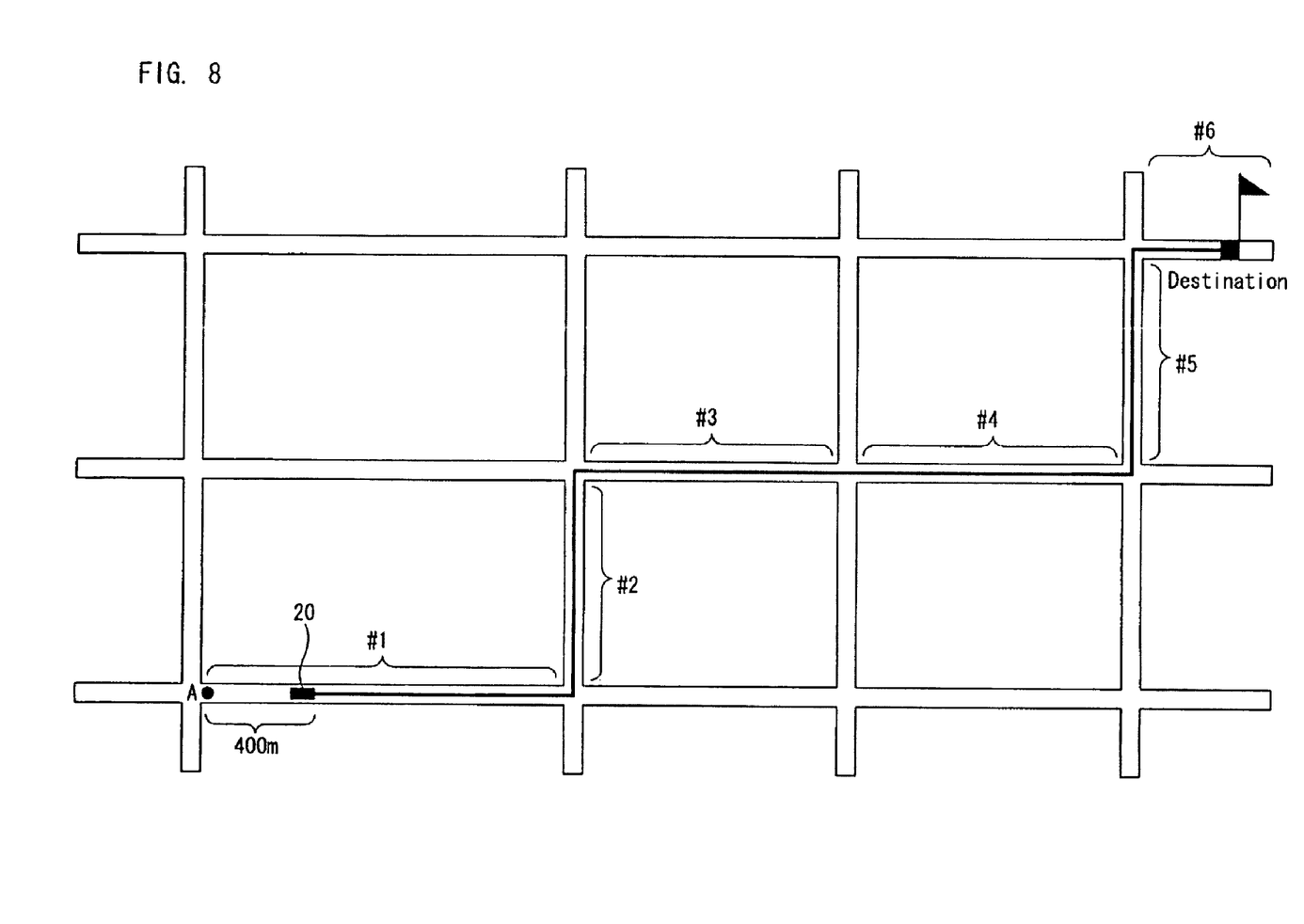
FIG. 8 is a pictorial diagram illustrating the flowchart of FIG. 7.

Thus, assume in FIG. 8 that a distance from the current location of the vehicle 20 to the end point of the first road link #1 is 7 km. Then, when the average link speed of the first road link #1 is about 60 km/h, the route cost obtained by dividing the average link speed of the first road link #1 by the distance from the current point of the vehicle 20 to the end point of the first road link #1 is 60/7. Further, the unit of the route cost is (1/h).

Figure 5B:
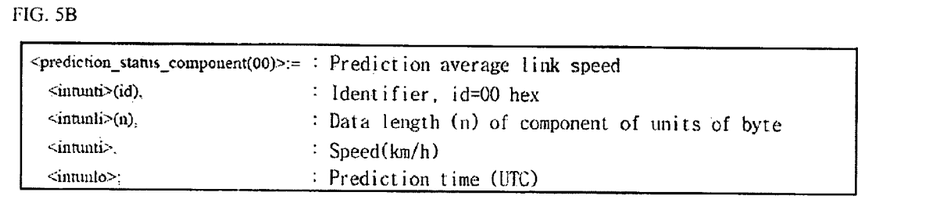
FIGS. 5B to 5E respectively illustrate a prediction average link speed, a prediction travel time, prediction congestion tendency, and an additional information format included in each status component of the congestion and travel time status component according to an embodiment of the present invention.
Figure 5C:
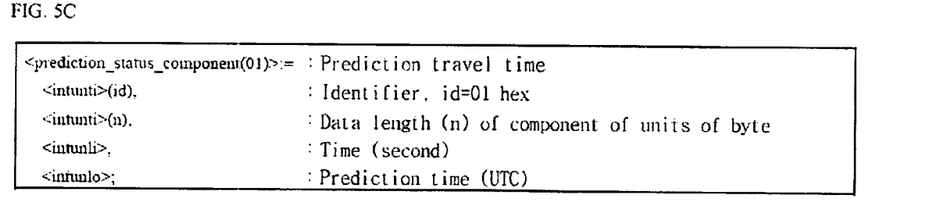
Figure 5D:
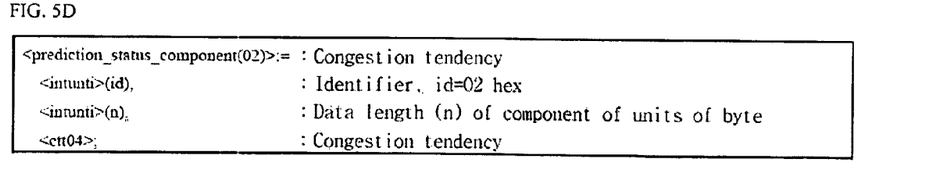
Figure 5E:
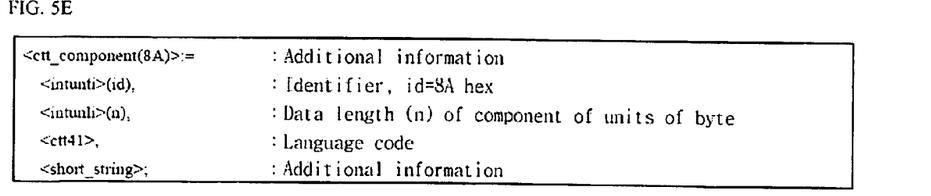

In addition, as shown in FIG. 7, the controller 150 calculates the route cost of each road link #2 to #6 using the prediction average link speed shown in FIG. 5B (S653). In more detail, the controller 150 checks the prediction average link speed at a time of arriving at the second road link #2 by referring to the memory unit 140. The time of arriving at the second road link #2 can be acquired by taking a reciprocal number of the route cost calculated with respect to the first road link #1. Also, the controller 150 calculates the route cost of the second road link #2 by dividing the checked prediction average link speed by the distance of the second road link #2.

A similar approach is used to calculate the route cost for road links #3 to #6. Then, when the route costs for the road links to the destination are calculated, the controller 150 adds the route costs of the road links (S654). Further, after the route cost of one route is calculated, the controller 150 calculates the route costs of the other detected routes (S655). Then, the controller 150 selects a route having the largest route cost from the detected routes as an optimal route and guides a user to the destination based on the selected optimal route (S656). The controller 150 can also check and display any additional information or auxiliary information related to the CTT information in a text format on the map.

In addition, if a predetermined event occurs resulting in the researching operation in step S670 while a user is traveling to the destination, and if the current road link of the vehicle 20 is not the final link in the step S690, the controller 150 re-performs the step S630 for searching routes from the current position of the vehicle 20 to the destination again and repeatedly performs the step S650.

Also, a predetermined event resulting in the researching operation occurs when the vehicle 20 enters a new road link, and/or when the traffic information receiving terminal 100 receives a TPEG message updated from the broadcasting station 15. In addition, if the current road link of the vehicle 20 is the final link and the predetermined event occurs resulting in the researching operation, the controller 150 does not research the route until the route guidance ends. That is, when the vehicle enters a new road link that is the final link where the destination is located, the controller 150 may not reselect a route, because the remaining distance to the destination is short.

Figure 9:
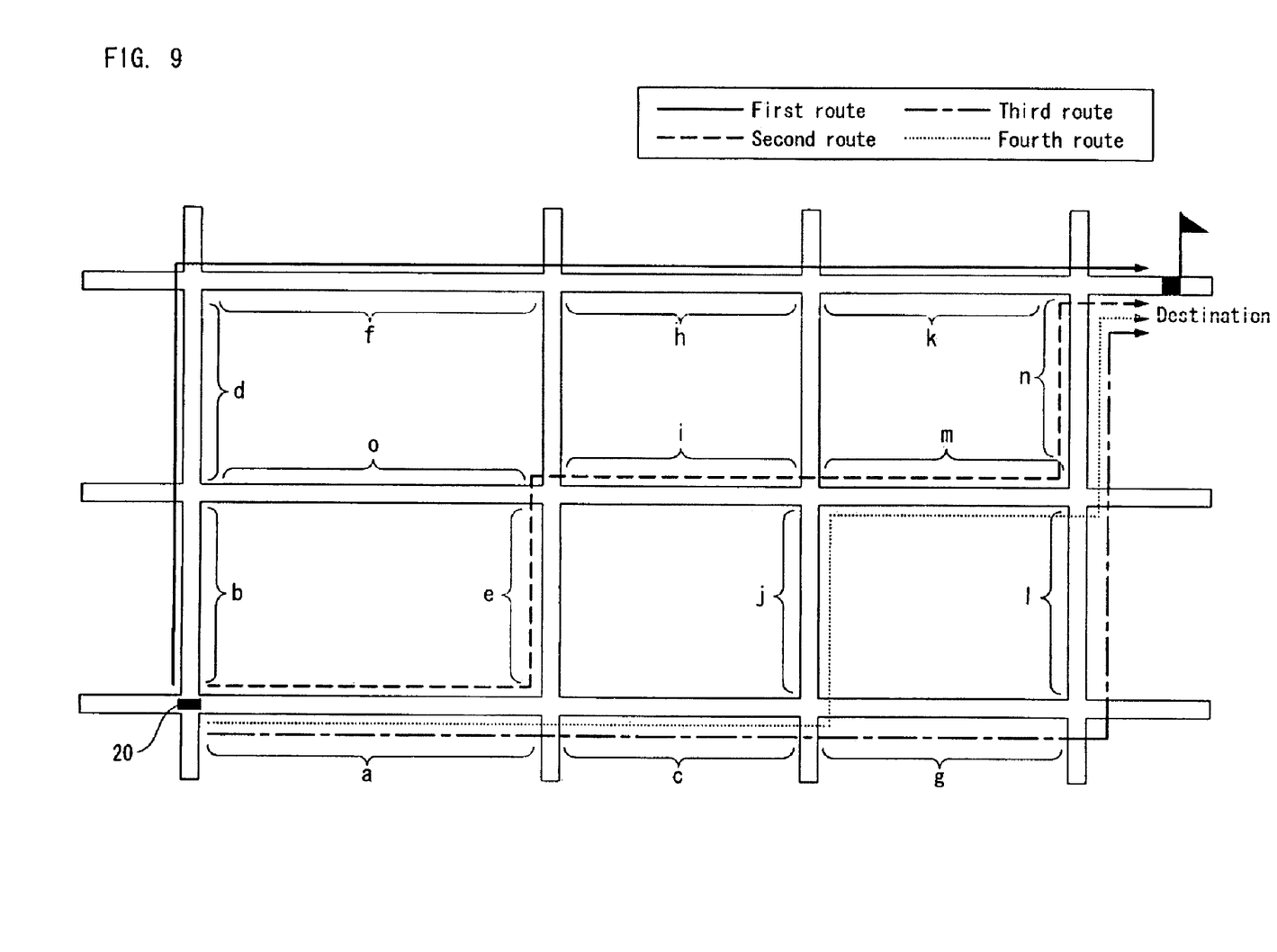
FIG. 9 is a pictorial diagram comparing a method of selecting a travel route according to an embodiment of the present invention with the related art method of selecting a travel route.

Next, FIG. 9 is a pictorial diagram comparing a method of selecting a travel route according to an embodiment of the present invention with the related art method of selecting a travel route. Four routes will be considered in the example. That is, the first route includes road links b-d-f-h-k, the second route includes road links a-e-i-m-n, the third route includes road links a-c-g-l-n, and the fourth route includes road links a-c-j-m-n.

First, with reference to FIG. 9, a method for calculating an optimal route to the destination according the related art will be described. Table 2 shows the average link speeds of the road links in the current time.

TABLE 2

| Road Link | Average Link Speed (km/h) |
|---|---|
| a | 60 |
| b | 30 |
| c | 60 |
| d | 50 |
| e | 60 |
| f | 30 |
| g | 30 |
| h | 50 |
| i | 60 |
| j | 40 |
| k | 50 |
| l | 30 |
| m | 50 |
| n | 50 |

Referring to Table 2, a route cost to the destination along the 4 routes is calculated based on the average link speed of the current time according to the related art as follows.

The first route $b \to d \to f \to h \to k = 30/5+50/5+30/10+50/5+50/5 = 6+10+3+10+10 = 39$ $(1/h)$.

The second route $a \to e \to i \to m \to n = 60/10+60/5+60/5+50/5+50/5 = 6+12+12+10+10 = 50$ $(1/h)$.

The third route $a \to c \to g \to l \to n = 60/10+60/5+30/5+30/5+50/5 = 6+12+6+6+10 = 40$ $(1/h)$, The fourth route $a \to c \to j \to m \to n = 60/10+60/5+40/5+50/5+50/5 = 6+12+8+10+10 = 46$ $(1/h)$.

Because the second route has the highest route cost according to the related art method, the second route is selected as the optimal route. However, the related art route selecting method does not accurately reflect road network and the traffic flow state which change in real time while the vehicle 20 is moving.

The embodiments of the present invention solve these problems. That is, the route selecting method of the present invention calculates a route cost to a destination using at least one of an average link speed at a current time and a prediction average link speed at a time of arriving at each road link. An example of this calculation is provided below.

Table 3 shows the prediction average link speeds at the time of arriving at each road link. Because the average link speed at the current time is applied to the road links a and b where the vehicle is currently located, the prediction average link speed corresponding to the road links a and b is omitted in Table 3.

TABLE 3

| Road Link | Prediction Average Link Speed (km) |
|---|---|
| c | 60 after 10 minutes |
| d | 40 after 10 minutes |
| e | 30 after 10 minutes |
| f | 40 after 17 minutes 30 seconds |
| g | 50 after 15 minutes |
| h | 40 after 32 minutes 30 seconds |
| i | 50 after 20 minutes |
| j | 40 after 15 minutes |
| k | 40 after 40 minutes |
| l | 50 after 21 minutes |
| m | 30 after 22 minutes 30 seconds |
|   | 40 after 26 minutes |
| n | 50 after 27 minutes |
|   | 40 after 32 minutes 30 seconds |
|   | 30 after 33 minutes 30 seconds |

Referring to Table 3, the route selecting method of the present invention will now be described in more detail. The road link a or b are applied with the average link speed shown in Table 1. Further, the other road links c, d, e, f . . . n are applied using the prediction average link speed of a time of arriving at corresponding road link. Because the route costs to the destination are the same in the road links for the destination, a route cost from a start point of the road link for the destination is omitted.

The first route $b \to d \to f \to h \to k = 30/5+40/5+40/10+40/5+40/5 = 12+8+4+8+8 = 40$ $(1/h)$.

The second route $a \to e \to i \to m \to n = 60/10+30/5+50/5+40/5+30/5 = 6+6+10+8+6 = 36$ $(1/h)$.

The third route $a \to c \to g \to l \to n = 60/10+60/5+50/5+505+50/5 = 6+12+10+10+10 = 48$ $(1/h)$.

The fourth route $a \to c \to j \to m \to n = 60/10+60/5+40/5+30/5+40/5 = 6+12+8+6+8 = 40$ $(1/h)$.

Therefore, in the present invention, which takes into account both of the current traffic congestion status information and the prediction traffic congestion status information, the third route is selected as an optimal route, which is a significant improvement over the related art method.

Accordingly, the route selecting method of present invention reflects the road network and the road status, which dynamically change in real-time while the vehicle 20 moves, by using the current traffic congestion status information and the prediction traffic congestion status information.

As described above, the present invention provides an improved navigation service that determines an optimal route using the average link speed as the present traffic congestion status information and the link predicted average speed as the predicted traffic congestion status information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of selecting a travel route, the method comprising:
    receiving a first position value and a second position value corresponding to first and second positions by a navigation terminal;
    searching for travel routes between the first and second positions;
    classifying the travel routes from the first position to the second position into a plurality of individual road links;
    receiving message information formed in a hierarchical structure and including traffic information, the traffic information including at least average link speed and predicted average link speed for the plurality of individual road links for predetermined periods of time;
    calculating a route cost for a first road link that includes the first position and a second road link directly connected to the first road link based on the average link speed for the first and second road links, respectively;
    calculating a route cost for each additional road link after the first and second road links up to a last road link including the second position based on one of the average link speed and the predicted average link speed; and
    calculating a total route cost for all of the road links for the travel routes from the first position to the second position,
    wherein the route costs for the first and second road links are calculated by dividing the average link speed of the first road link by a distance of the first road link and by dividing the average link speed of the second road link by a distance of the second road link, respectively.

2. The method of claim 1, wherein the route cost for said each additional road link is calculated by dividing the predicted average link speed for said each additional road link by a distance of the corresponding road link.

3. The method of claim 1, wherein the first position is a current position or a starting position of a vehicle that is going to travel from the first position to the second position.

4. The method of claim 1, wherein the second position is a destination position that a vehicle is traveling to.

5. The method of claim 1, wherein the predicted average link speed is a predicted travel time required for the corresponding road link at a time of arriving at the corresponding road link.

6. The method of claim 1, wherein the message information formed in the hierarchical structure is a Transport Protocol Expert Group (TPEG) message.

7. The method of claim 1, further comprising:
    determining if a new message information is going to be received before traveling through the first road link; and
    calculating the route cost for the first and second road links using the previously received average link speed, when the determining step determines the new message information is not going to be received before traveling through the first road link.

8. The method of claim 1, further comprising;
    selecting a travel route that has a highest total route cost; and
    performing a routing process to route a vehicle along the selected travel route having the highest total route cost.

9. The method of claim 8, further comprising:
    determining if a specific event has occurred; and
    re-searching for travel routes between the first and second positions when the determining step determines the specific event has occurred.

10. The method of claim 9, wherein the determining step determines the specific event has occurred when traveling into a new road link and when receiving updated message information.

11. A navigation terminal, comprising:
    a receiving unit configured to receive message information formed in a hierarchical structure and including traffic information, the traffic information including at least average link speed and predicted average link speed for predetermined periods of time;
    an input unit configured to receive a first position value and a second position value corresponding to first and second positions; and
    a control unit configured to search for travel routes between the first and second positions, to classify the travel routes from the first position to the second position into a plurality of individual road links, to calculate a route cost for a first road link that includes the first position and a second road link directly connected to the first road link based on the average link speed for the first and second road links, respectively, to calculate a route cost for each additional road link after the first and second road links up to a last road link including the second position based on one of the average link speed and the predicted average link speed, and to calculate a total route cost for all of the road links for the travel routes from the first position to the second position,
    wherein the route costs for the first and second road links are calculated by dividing the average link speed of the first road link by a distance of the first road link and by dividing the average link speed of the second road link by a distance of the second road link, respectively.

12. The navigation terminal of claim 11, wherein the route cost for said each additional road link is calculated by dividing the predicted average link speed for said each additional road link by a distance of the corresponding road link.

13. The navigation terminal of claim 11, wherein the first position is a current position or a starting position of a vehicle that is going to travel from the first position to the second position.

14. The navigation terminal of claim 11, wherein the second position is a destination position that a vehicle is traveling to.

15. The navigation terminal of claim 11, wherein the predicted average link speed is a predicted travel time required for the corresponding road link at a time of arriving at the corresponding road link.

16. The navigation terminal of claim 11, wherein the message information formed in the hierarchical structure is a Transport Protocol Expert Group (TPEG) message.

17. The navigation terminal of claim 11, wherein the control unit is further configured to determine if a new message information is going to be received before traveling through the first road link, and to calculate the route cost for the first and second road links using the previously received average link speed, when the determining step determines the new message information is not going to be received before traveling through the first road link.

18. The navigation terminal of claim 11, the control unit is further configured to select a travel route that has a highest total route cost; and to perform a routing process to route a vehicle along the selected travel route having the highest total route cost.

19. The navigation terminal of claim 18, the control unit is further configured to determine if a specific event has occurred, and to re-search for travel routes between the first and second positions when the determining step determines the specific event has occurred.

20. The navigation terminal of claim 19, wherein the control unit is further configured to determine the specific event has occurred when traveling into a new road link and when receiving updated message information.

* * * * *